United States Patent [19]
Guyot et al.

[11] Patent Number: 5,833,007
[45] Date of Patent: Nov. 10, 1998

[54] CONTAINER FOR MANURE

[75] Inventors: Jean-Noel M. Guyot, Box 179, Oakbluff Manitoba, Canada, R0G 1N0; Rene R. Rosset, Winnipeg, Canada

[73] Assignee: Jean-Noel M. Guyot, Oakbluff, Canada

[21] Appl. No.: 593,404

[22] Filed: Jan. 29, 1996

Related U.S. Application Data

[63] Continuation-in-part of Ser. No. 247,664, May 23, 1994, abandoned.

[51] Int. Cl.$^6$ .................................................. A62C 3/00
[52] U.S. Cl. .................................. 169/54; 169/13; 169/70; 52/247; 52/63; 52/82
[58] Field of Search .................................. 169/13, 54, 70; 52/247, 63, 82, 192, 169.14

[56] References Cited

U.S. PATENT DOCUMENTS

| | | | |
|---|---|---|---|
| 1,100,081 | 6/1914 | Kramer | 52/247 |
| 1,222,849 | 4/1917 | Coons | 52/247 |
| 2,378,161 | 6/1945 | Sawyer | 52/63 |
| 2,694,454 | 11/1954 | Eickmeyer | 169/13 |
| 3,179,181 | 4/1965 | Banzato | 169/13 |
| 3,522,910 | 8/1970 | Pfeiffer et al. . | |
| 4,649,113 | 3/1987 | Gould . | |
| 4,756,033 | 7/1988 | Schelfhorst | 52/247 |
| 5,005,345 | 4/1991 | Pinckard et al. . | |
| 5,168,682 | 12/1992 | Rye | 52/247 |
| 5,444,943 | 8/1995 | Schelfhorst | 52/63 |

FOREIGN PATENT DOCUMENTS

| | | |
|---|---|---|
| 87/13335 | 9/1997 | France . |
| 7514909 | 6/1977 | Netherlands . |
| 10082 | 6/1992 | WIPO . |

OTHER PUBLICATIONS

Brochure by Bauer "Boom Cart AS 45".
Article entitled Fertilisation Du lisier sur blé.

*Primary Examiner*—Gary C. Hoge
*Attorney, Agent, or Firm*—Adrian D. Battison; Murray E. Thrift

[57] ABSTRACT

A method of farming comprises collecting waste material such as manure from animal farming, or effluent from food processing plants or the like in a closed container, stirring and aerating the material within the container and adding yeast and phosphoric acid to increase aerobic bacterial activity while reducing anaerobic bacteria and rendering the material into a pumpable liquid. The collected manure is stored in a cylindrical container having a plastics liner and roof and is used as a fire suppressant material for dowsing fires in the farm buildings by providing a pump and hose on the container or hydrant located adjacent to the buildings.

3 Claims, 6 Drawing Sheets

CONTAINER FOR MANURE

This application is a continuation-in-part application of application Ser. No. 08/247,664 filed May 23, 1994 now abandonment.

BACKGROUND OF THE INVENTION

This invention relates to a container for manure for use in a farming method using waste material containing organic matter.

Waste material or effluent which contains organic materials, such as that from intensive animal farming operations, food processing plants and city sewage, constitutes a serious problem in that in large quantities the material is toxic and in that the material can give off noxious fumes. Disposal of such materials is therefore difficult and the development of such materials from the operation can inhibit the installation of new plants to carry out such processing.

Usually such waste material is stored in a lagoon which is simply a hollowed open area into which the material is pumped to allow settling of the solid matter to the bottom of the lagoon and dispersal of the liquid and gas content by evaporation. Periodically it is necessary to remove the settled solids and these are often simply dumped into an open field. The continuous evaporation of the liquid acts to discharge into the air noxious gases which leads to environmental pollution which is becoming politically unacceptable. The lagoon can also leak so as to cause contamination of the ground water.

One problem relating to manure handling, therefore, is that of storing the manure in a suitable container. Cylindrical containers have previously been manufactured but generally these are formed from high cost coated panels and are open at the top so that the noxious gases produced in the anaerobic bacterial action are released to the atmosphere.

It is also known in Europe that such containers should be manufactured using a metal wall with a plastic liner. On top of the container so formed is attached a roof structure of a plurality of transverse trusses covered by a layer of plastic with a vent opening to release excess pressure. However this structure is expensive and thus resisted by producers used to the low cost lagoon.

A further problem in regard to farm buildings particularly for animal husbandry in which manure is produced is that of fire in the buildings which can occur in any of the electrical or heating equipment in the buildings and is difficult to dowse due to the remote location of the farm which delays the arrival of the fire fighters and makes difficult the supply of sufficient water under pressure for dowsing the fire.

SUMMARY OF THE INVENTION

It is one object of the present invention, therefore, to provide an improved container for manure.

According to a first aspect of the invention there is provided a container for manure comprising: a base foundation defining a horizontal support surface; a cylindrical wall surrounding a vertical axis and mounted on the horizontal support surface so as to be upstanding therefrom and having an open top; the base foundation comprising a concrete ring defining an annular upper surface forming said horizontal support surface with an area inside the ring being free from concrete; and a plastics liner laid across the area inside the ring, over the ring and on an inside surface of the wall so as to render the container impervious to liquid for containing the manure therein.

It is a further object of the invention to provide a system available to farmers to allow ready dowsing of any fire which may arise in farm buildings associated with animal husbandry.

According to a second aspect of the invention there is provided a container for manure comprising: a cylindrical wall surrounding a vertical axis and mounted on a horizontal support surface so as to be upstanding therefrom and having an open top; lining means on an inside surface of the wall so as to render the wall impervious to liquid for containing the manure therein; a cover assembly for the open top; a pump for extracting manure from the tank; and a jet nozzle arranged to be supplied with the manure under pressure and arranged to spread the manure onto a building adjacent the container for dowsing a fire in the building.

According to a third aspect of the invention there is provided an apparatus for dowsing a fire in farm buildings comprising: at least one building housing animals producing manure; a container for receiving and containing the manure including a cylindrical wall surrounding a vertical axis and mounted on a horizontal support surface so as to be upstanding therefrom and having an open top, lining means on an inside surface of the wall so as to render the wall impervious to liquid for containing the manure therein and a cover assembly for the open top; a pump for extracting manure from the tank; and a jet nozzle arranged to be supplied with the manure under pressure and arranged to spread the manure onto the building adjacent the container for dowsing a fire in the building.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
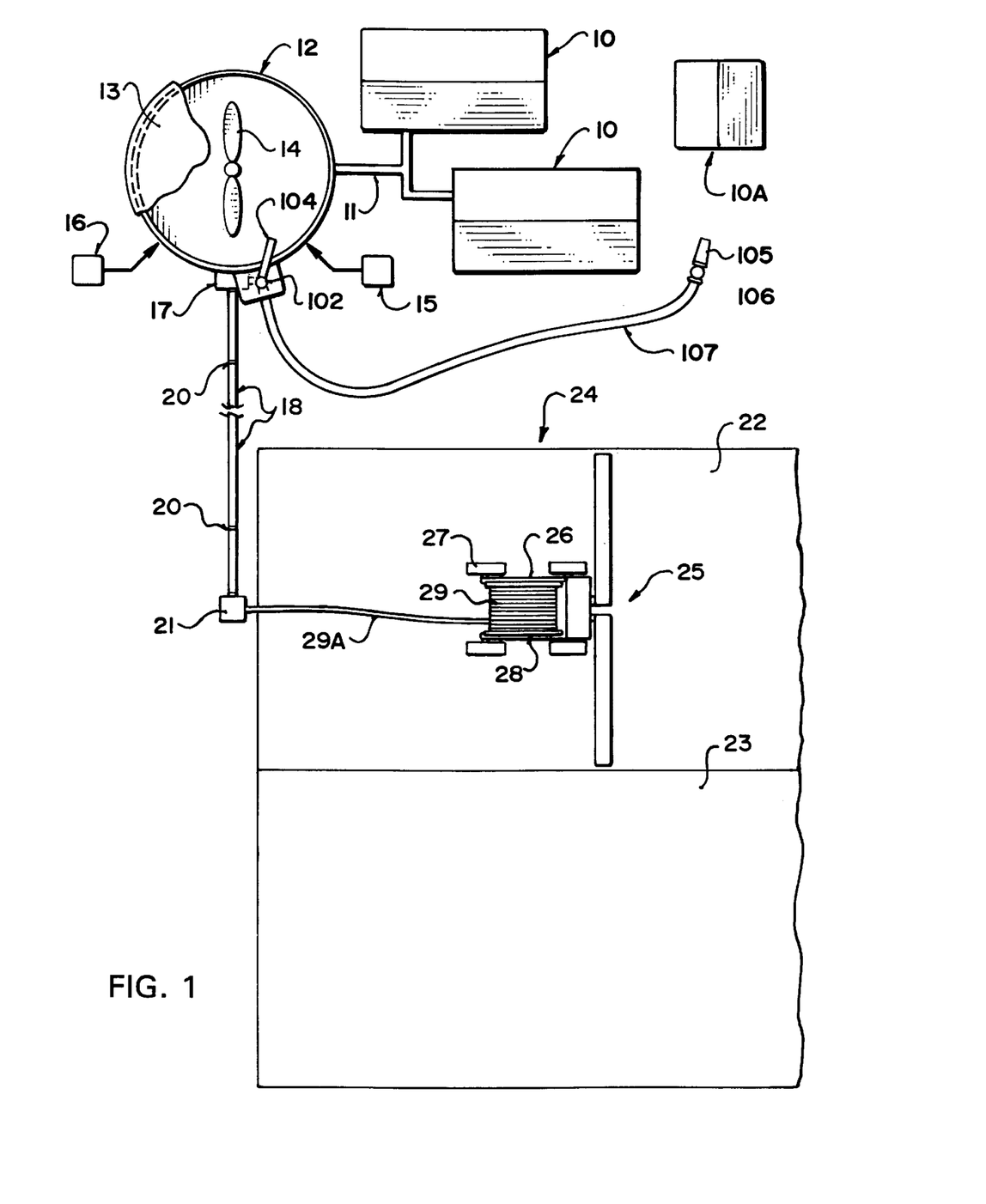
FIG. 1 is a schematic plan view of the farming system according to the present invention.

In FIG. 1 is shown an overview of the farming method according to the present invention which comprises an intensive farming system or processing system generally indicated at 10 which produces effluent or waste material on a discharge duct 11 for supplying to a storage container 12. In one example intensive farming process comprises a hog barn in which mostly liquid manure is released from a flooring collection system for discharge through the duct 11 to a liquid storage container or slurry tank 12. The storage container can be of any suitable type including a metal container of the type formed from corrugated metal panels similar to a grain bin, a concrete pit or the like which is preferably covered by a closed roof 13 which contains the liquid and any gases escaping from the liquid surface. Within the container is provided a stirring system schematically indicated at 14 which maintains the waste material mixed to ensure that solids remain in suspension. An aerator is schematically indicated at 15 for injecting air into the stored liquid waste material for purposes of aeration. The details of the air injection system are not shown as these will be well known to one skilled in the art. In addition a solids injection system is indicated at 16 for injecting various solids including yeast, additive compound such as micro nutrients and phosphoric acid as discussed hereinafter.

Figure 6:
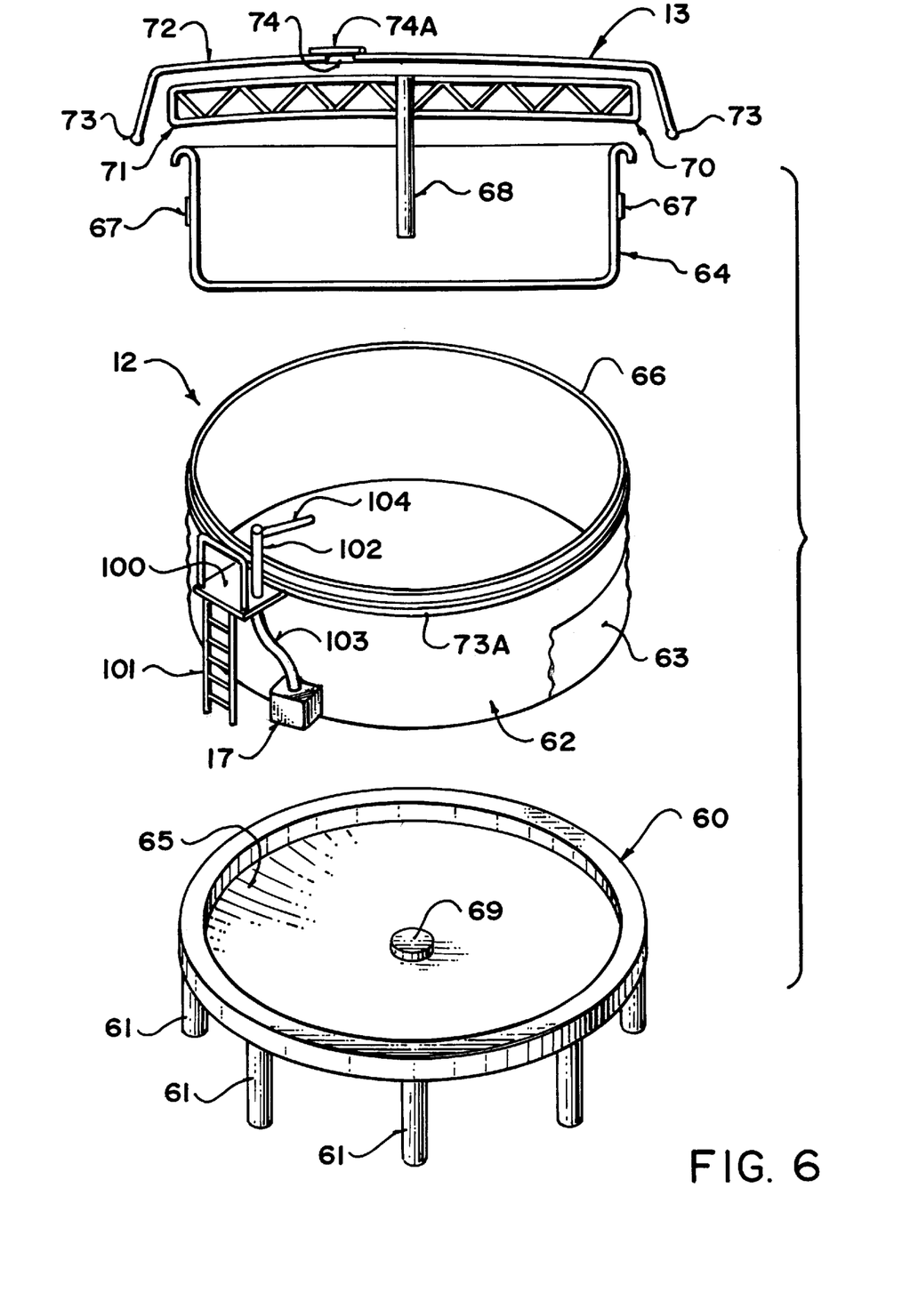
FIG. 6 is an exploded schematic isometric view of the closed container for receiving the waste material.

The construction of the container is shown schematically in FIG. 6. This comprises an annular footing 60 which can be floating or (as shown) mounted on piles 61. On top of the footing is mounted a container wall 62 formed of corrugated panels 63 which are bolted together to form a cylindrical wall standing on the footing. The wall is of the type conventionally used for a grain bin and is manufactured of structural members and the corrugated panels with sufficient structural strength to accommodate the weight and forces from the liquid waste to be contained therein.

Within the wall 62 is provided a liner 64 of a suitable plastics material. This can be spray coated onto the interior of the wall or more preferably is formed as a skin which is laid across the open ground 65 inside the annular footing 60 and extends up the wall 62 to a top edge 66. The liner is attached to the wall either mechanically or using an adhesive layer 67 which is applied onto the liner 64 on the outside surface thereof at the areas thereof engaging the wall 62 so as to affect a bonding between the liner and the wall. A roof structure comprises a central tubular post 68 sitting on a pad 69 mounted on the ground 65 centrally of the angular footing. The post carries an inner end of a plurality of radially extending trusses 70, 71 which extend outwardly into engagement with a structural member at a top edge of the wall 62. Over the trusses is stretched a circular fabric cover 72 with a lower edge bead 73 which engages with a suitable attachment 73A around the upper edge of the wall in a sealing action. Thus the container is effectively fully sealed by the liner 64 and the fabric cover 72 to prevent any escape of gases from the container. A vent opening 74 is provided covered with a flap valve 74A in the form of a simple rubber sheet to release some gases in the event of significant over pressure to prevent damage to the structure. A structure without the post can also be used using trusses extending across the container from the side wall taking the full load of the fabric cover. The trusses 70 are formed of stainless steel to prevent corrosion in the corrosive gases. The fabric is formed or coated with a suitable impermeable plastics material to prevent escape of the gases and to resist the corrosive effect of the gases. The use of the fabric cover also allows some expansion of the gases due to temperature changes which can be accommodated by slight lifting of the fabric. In the event that the expansion is greater than can be safely accommodated by the lifting of the fabric, the flap valve 74A lifts to release over pressure through the opening 74.

A discharge pump is schematically indicated at 17 for discharging the liquid material from the container 12 along a temporary pipe line 18 which can be formed of a number of segments connected at junctions 20 or can be a continuous irrigation hose wound on a reel. Temporary piping of this nature can be installed relatively quickly over an extensive length to an outlet location 21 which constitutes a central supply point for discharging the material from the container 12 over a number of strips 22, 23 of a field 24 on which the material is to be sprayed.

Figure 3:
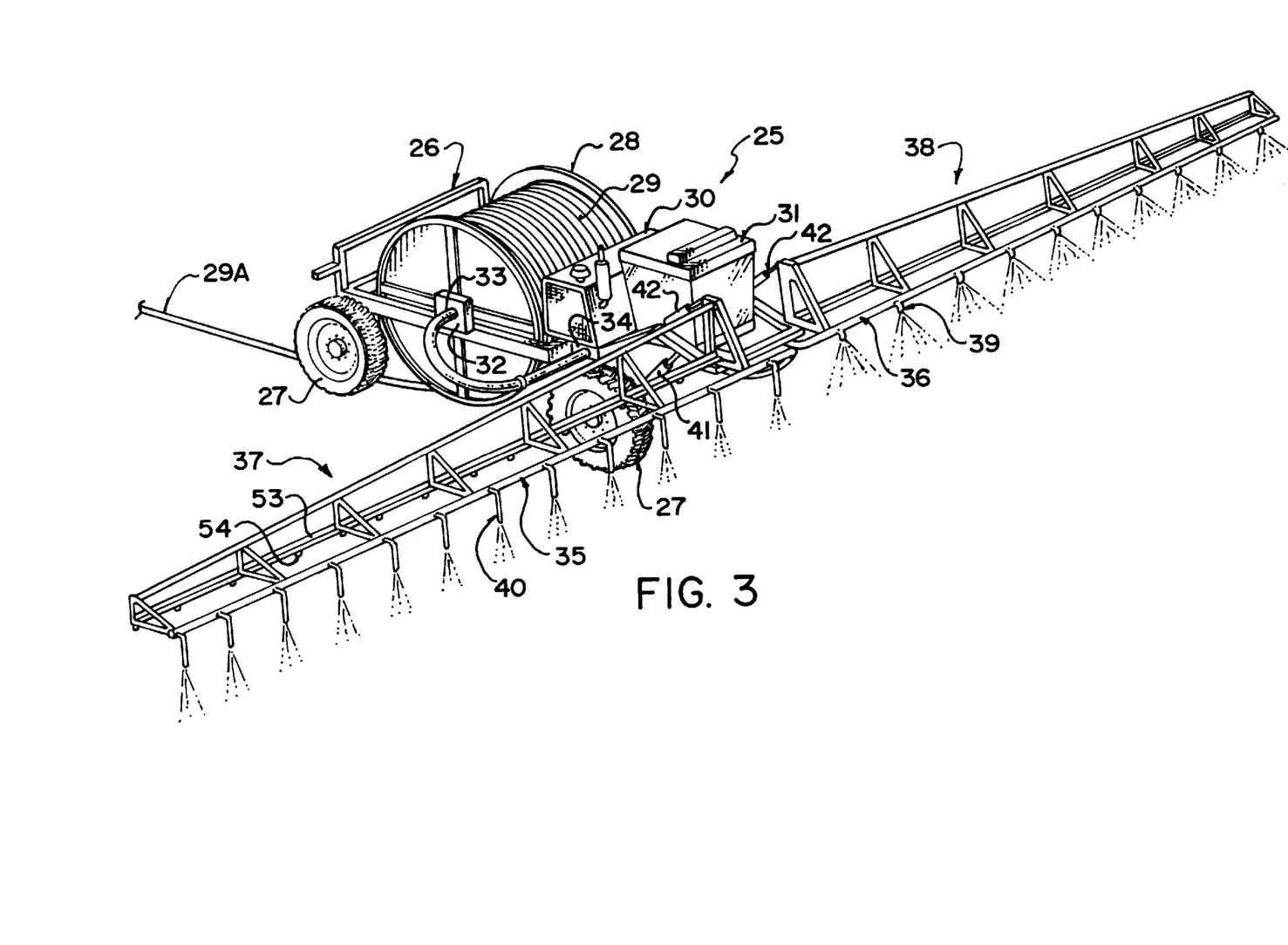
FIG. 3 is an isometric view of a machine for spreading the waste materials.
Figure 4:
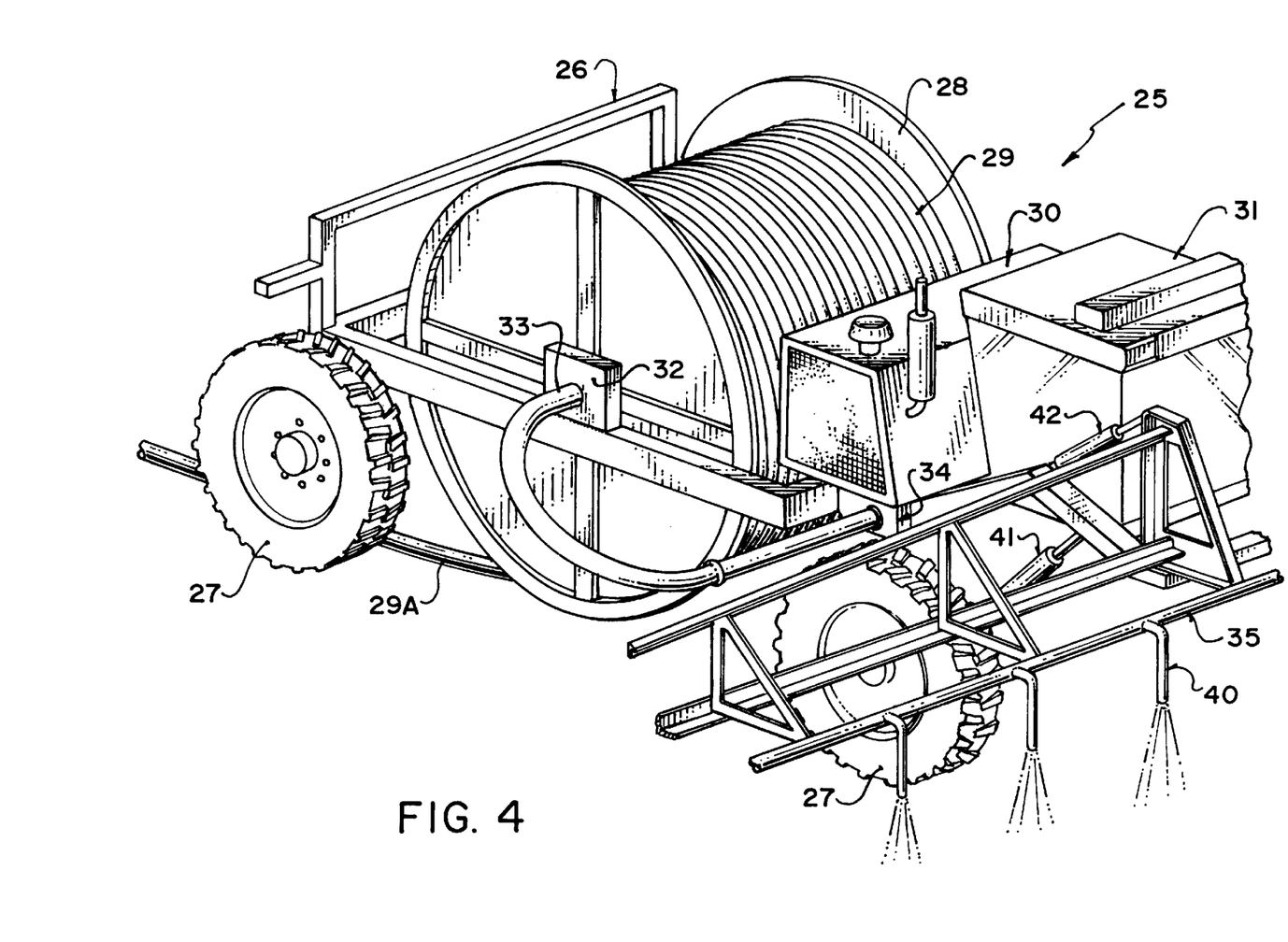
FIG. 4 is an enlarged view of the central vehicle portion of the machine of FIG. 3.
Figure 5:
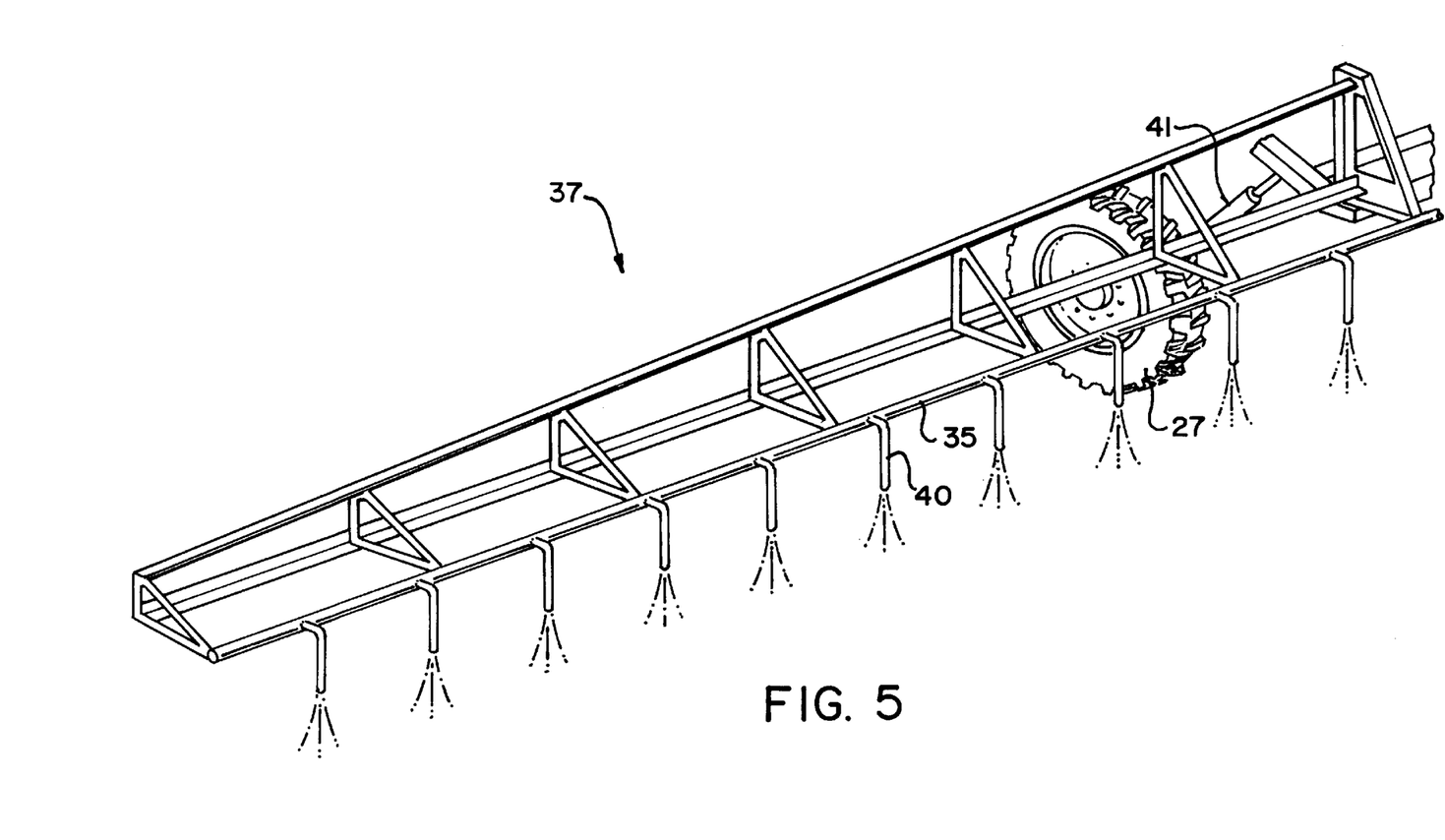
FIG. 5 is an enlarged view of one boom of the vehicle of FIG. 3.

The material is sprayed onto the strips of the field 22, 23 etc. by a spray vehicle shown schematically in FIG. 1 at 25 and shown in more detail in FIG. 3, 4 and 5. The spray vehicle comprises a vehicle frame 26 mounted on ground wheels 27 for movement across the ground. The vehicle is relatively large having a width of the central vehicle portion of the order of 10 feet and a length of the order of 25 feet. The vehicle portion carries a large reel 28 on which is wound a pipe 29, a trailing portion 29A which extends from the reel across the field to the discharge location 21. In one example the diameter of the reel is of the order of 13 feet and the length of the pipe is of the order of 1320 feet (500 meters) of a diameter of 3–4 inches (12 cms). Also on the vehicle frame is mounted an engine 30 for generating hydraulic power for communication to the four independent drive wheels 27. The details of the drive communication system are not shown as these are well known to one skilled in the art. A cab 31 is mounted at the front of the frame for receiving the driver for controlling the direction and operation of the waste material discharge machine 25. An inner end of the pipe 29 is connected to a swivel coupling 32 at which is attached a pipe 33 for communication to a supplementary drive pump 34 driven by the engine 30. The pump 34 drives the material along supply lines 35 and 36 of two boom elements 37 and 38 respectively. The pipes 35 and 36 each carry a plurality of discharge nozzles 39, 40. The discharge nozzle 39 of the boom 38 are shown as spray nozzles and this is preferred for evenly spraying the liquid across the ground. The discharge openings 40 of the boom 37 are shown as simple vertical discharge pipes and these can be used for row crops in a situation where the machine is used after planting for discharge of the liquid onto the ground between the rows of the planted crop.

The boom elements are mounted on the frame for lifting and twisting movements by hydraulic cylinders 41, 42 which allow the boom elements to be folded along side the sides of the vehicle during transportation and to effect raising and lowering of the boom elements as required to accommodate changes in ground level.

Preferably the boom elements have a combined width of 100 to 150 feet. Discharge of the liquid material onto the ground at a rate in the range 1000 to 5000 gallons per acre can thus be effected at a rate of 3 to 7 acres per hour. Such a discharge rate enables the discharge of a typical container having 300,000 gallons within a period of 10 to 20 hours.

The construction of the boom is shown only schematically as this can vary in accordance with design requirements.

Figure 2:
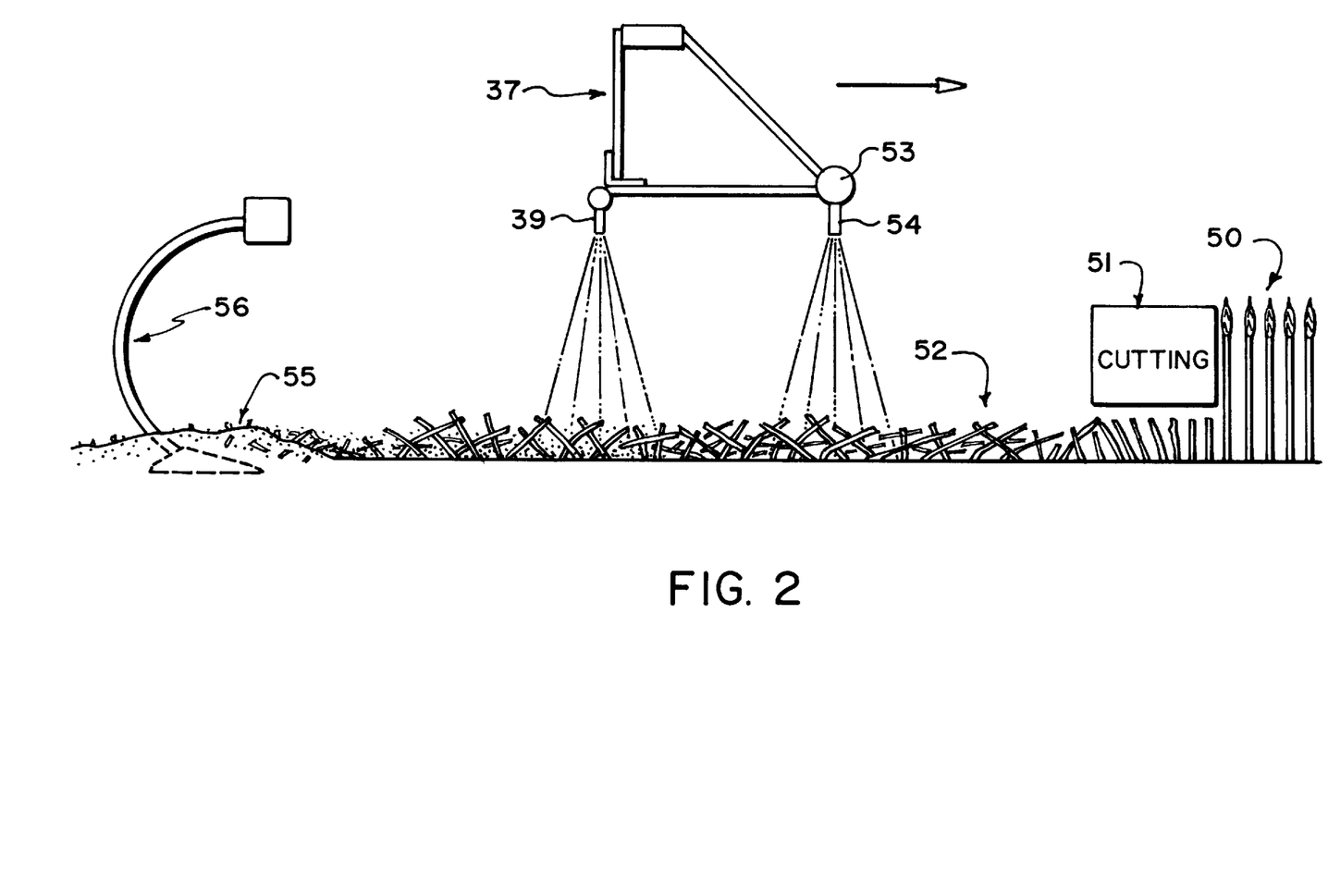
FIG. 2 is a schematic illustration of the operation of the farming system on the ground and the crop residue thereon.

Turning now to FIG. 2, the process in its operation in relation to the material on the ground is shown schematically.

In the process, the waste material to be discharged can comprise manure from a hog plant, manure or effluent from a sewage plant or other mainly liquid material containing organic materials such as effluent from a vegetable or meat processing plant. The material is arranged by addition of liquid to be mostly liquid and of sufficiently liquid nature to be pumpable through the pipeline and through the pipe 29A to the boom and the spray nozzles. For this purpose a solids content less than 8% is generally required.

The treatment of the liquid material in the container includes the following:

1) aeration by injection of aeration air from the injector 15 to promote aerobic bacterial action and to reduce anaerobic bacterial action. It is known that the anaerobic bacterial action generates production of noxious fumes which become unacceptable to surrounding persons not connected with the production site.

2) Addition of phosphorous compound or phosphoric acid. This addition acts to stabilize the nitrogen content within the liquid by locking in the ammonia. In particular, the addition of phosphoric acid to ammonia generates ammonium phosphate which is a stable compound widely used as a fertilizer.

3) The addition of a yeast which can preferably be a recycled beer yeast and this acts to break down the solids from the manure to increase the liquid content and render the liquid pumpable.

4) The stirring action by the stirrer 14 which maintains the materials mixed to effect the above action on the materials.

5) The addition of water if required to reduce the solids content to a level in the range 5 to 8% which provides the pumpable mixture. Generally the addition of yeast to break down the solids is preferred to avoid the addition of further water which may not be readily available.

6) The addition by the injector 16 of micro nutrients or other additives which are selected in accordance with requirements for the particular field 24 to be covered with the materials. Thus, as the present method is intended as a fertilization system, the required content of the fertilizer can be manipulated to match the requirements of the field as assessed by analysis of the soil in well known manner.

As shown in FIG. 2, a standing crop is indicated at 40 and this is cut by a conventional cutting action indicated schematically at 41. The cutting action schematically indicated at 41 may comprise any suitable technique for chopping the crop residue into short lengths of preferably two inches maximum length and at the same time breaking the stems of the crop residue to expose the inner material. Such an action can be effected by a separate mowing process carried out after harvesting or can be effected by use of an effective chopper and spreading action on the combine harvester. It is necessary in addition that the crop residue or trash be spread evenly across the ground.

The crop residue in evenly spread chopped condition is therefore indicated at 42. The boom element 37 is shown in FIG. 2 passing over the ground on which the evenly spread crop residue is shown. The waste material is discharged in a spray pattern from the nozzles 39 onto the crop residue in even manner determined by the spray pattern of the nozzles and the spacing of the nozzles. The liquid manure is thus accurately broadcast onto the fields at a regulated flow rate in the range 1000 gallons per acre to 5000 gallons per acre. Simultaneously with the spraying of the manure is provided a second spray line 53 with spray nozzles 54 arranged for spraying a liquid oxidizing agent such as hydrogen peroxide onto the trash and the manure. The hydrogen peroxide or oxidizing agent is preferably sprayed at a rate in the range two liters to five liters per cubic meter of straw or crop residue. The Hydrogen peroxide rate identified above relates to 130 volume concentration and the man skilled in the art will of course be able to calculate modified rates for different concentrations of the oxidizing agent. The oxidizing agent acts to further decompose the outer protective shell of the crop residue and acts to accelerate aerobic bacterial and fungal attack on the crop residue. Furthermore the oxidizing agent effectively eradicates any anaerobic bacteria remaining in the manure so as to inhibit or prevent the generation of noxious gases, such as methane and hydrogen sulfide, which are a resultant of the anaerobic bacterial activity. Thus the previous treatment as explained above of the manure in conjunction with the addition of the oxidizing agent at the point of application of manure to the ground cooperate in preventing the generation of the free ammonia which constitutes the objectionable smell associated with the manure. In addition the simultaneous spraying of the oxidizing agent and the manure significantly increases the rate of bacterial and fungal attack on the crop residue since the manure brings high levels of aerobic bacteria and fungus to the mixture to assist in breaking down the crop residue.

The rapid action of the decomposition is important as this fertilizer, that is the combination of the manure and the crop residue, is applied onto the fields prior to seeding or after seeding and constitutes a replacement for the commercial fertilizer otherwise used. In cases where the manure is applied after seeding, the oxidizing agent is omitted to avoid damaging the crops and since in most cases it is not required to effect break down of the straw. Application after seeding is therefore likely to be limited to areas where the release of some smells does not constitute an environmentally unacceptable situation.

To achieve the rapid decomposition, the crop residue and stubble must be in contact with the liquid manure and accordingly the even spread of the crop residue across the ground is highly important and in addition it is necessary to apply equally an even spread of the manure.

As shown in FIG. 2, the oxidizing agent is preferably sprayed from the same boom as the waste material but is sprayed onto the ground in advance of the waste material. This allows the agent to engage the straw in advance of the waste material and thus minimizes the required rate to 1–2 liters per cubic meter of straw. In the alternative, the oxidizing agent can be sprayed from a separate nozzle at the same location as the nozzle 39 to reach the straw simultaneously with the waste material, but in this case the rate must be increased to the order of 5 liters.

Subsequent to the application of the manure and the oxidizing agent, the trash and manure is then incorporated into the soil to a maximum depth of two inches. This is illustrated schematically at 55. The incorporation can be effected by any conventional cultivation equipment such as a harrow, a cultivator sweep as illustrated at 56 or a hoe. The incorporation is effected as soon as possible after completion of the spraying of the material and generally within 24 hours. Incorporation to a depth greater than two inches will significantly inhibit or delay the decomposition due to the absence or the exclusion of oxygen which is necessary for the aerobic bacterial activity.

The method according to the present invention, therefore, has a number of major advantages.

1) It disposes of the liquid manure or other liquid effluent which is otherwise problematic.

2) It disposes of the crop residue which also can in some cases be problematic.

3) The disposal of both of the above materials is effected in a manner which generates an improved organic fertilization system. Thus reducing the necessity for other types of fertilizer.

4) The process is effected using equipment specifically designed for the task which enables the application of the manure to be effected rapidly and economically.

In addition to the farming techniques described herein before and the structure of the container described herein before, the present system also provides for the farmer involved in animal husbandry a system for dousing or extinguishing fires that may arise in the associated buildings.

Thus in FIG. 1 the farming system includes the container 12 which is associated with the farm buildings 10 which relate to the animal husbandry system. Additional farm buildings 10A are also included on the site which may or may not be involved directly in containing the animals producing the manure for containing in the container 12.

The present inventors have realized that the manure, if maintained in the proper condition set forth herein before in the container as defined herein before can be used for dousing or extinguishing fires in the adjacent animal husbandry and related buildings. Thus as shown in FIGS. 1 and 6, the container 12 has a platform 100 located at one part of its periphery adjacent the top edge of the wall. The platform 100 is reached by a ladder system 101. It will be appreciated that in a practical system, the wall may reach up to 35 feet in height and hence the platform is raised to a significant height from the ground.

On the platform is mounted a rotatable pipe 102 which is connected to the pump 17 by a hose 103. Attached to the pipe 102 is a nozzle 104 which can direct the manure from the container through the pump 17 at high pressure as a jet of the manure to be spread over the adjacent farm buildings 10. In the event that any fire arises, therefore, the full volume of the liquid manure, maintained in the liquid condition as described herein before is available for pumping onto the fire to douse the flames at a relatively early stage. The fire fighters are therefore not limited by the significant distance which is generally a problem in rural areas and by the unavailability of a supply of suitable dousing liquid.

In addition the manure has a high level of dousing effect due to the high solids content which reduces the evaporation, with the solids generally being incombustible in the liquid suspension.

In addition to the jet nozzle 104, a second jet nozzle 105 with associated stand pipe 106 can be located at a remote position relative to the container coupled by a longer hose 107 so that the jet nozzle 105 can apply the same manure from the pump 17 to associated but remote buildings 10A.

The present system therefore provides the advantage to the farmer of rapid dousing of fires which can and do regularly occur in a normal husbandry operations causing large scale damage and often unpleasant death of the contained animals. In addition the availability of a rapid fire extinguishing system can reduce insurance costs which are heavily based upon this high fire risk.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for dowsing a fire in farm buildings comprising:

at least one building housing animals producing manure;

a container for receiving and containing the manure including a cylindrical wall surrounding a vertical axis and mounted on a horizontal support surface so as to be upstanding therefrom, and a liner on an inside surface of the wall so as to render the wall impervious to the manure therein;

a duct system for transferring the manure from the building to the container for storage therein a pump for extracting manure from the tank;

and a jet nozzle arranged to be supplied with the manure under pressure and arranged to spread the manure onto a building adjacent the container for dowsing a fire in the building.

2. The apparatus according to claim 1 wherein the nozzle is mounted on the container at a location raised from the ground so as to allow spreading of the manure directly from the container onto the building.

3. The container according to claim 1 wherein the nozzle is mounted on an end of a hose for transporting the manure from the container and for spreading the manure through the nozzle onto the building.

* * * * *